(12) United States Patent  
Chintalapati et al.

(10) Patent No.: US 10,769,007 B2
(45) Date of Patent: Sep. 8, 2020

(54) COMPUTING NODE FAILURE AND HEALTH PREDICTION FOR CLOUD-BASED DATA CENTER

(71) Applicant: Microsoft Technology Licensing, LLC, Redmond, WA (US)

(72) Inventors: Murali M. Chintalapati, Bellevue, WA (US); Ken Hsieh, Kirkland, WA (US); Youjiang Wu, Bellevue, WA (US); Randolph Yao, Jiaxing (CN); Qingwei Lin, Beijing (CN); Yingnong Dang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 101 days.

(21) Appl. No.: 16/003,519

(22) Filed: Jun. 8, 2018

(65) Prior Publication Data

US 2019/0377625 A1    Dec. 12, 2019

(51) Int. Cl.
*G06F 11/00* (2006.01)
*G06F 11/07* (2006.01)
(Continued)

(52) U.S. Cl.
CPC ...... *G06F 11/0709* (2013.01); *G06F 9/45558* (2013.01); *G06F 11/0751* (2013.01);
(Continued)

(58) Field of Classification Search
CPC .............. G06F 11/0709; G06F 11/079; G06F 11/2257; G06F 11/2263
(Continued)

(56) References Cited

U.S. PATENT DOCUMENTS 9,400,731 B1 *   7/2016   Preece ................ G06F 11/3447
9,813,379 B1    11/2017   Shevade et al.
(Continued)

FOREIGN PATENT DOCUMENTS

| CN | 102932419 A | 2/2013 |
| CN | 106969924 A | 7/2017 |
| CN | 107463998 A | 12/2017 |

OTHER PUBLICATIONS

"International Search Report and Written Opinion Issued in PCT Application No. PCT/US2019/034769", dated Jul. 30, 2019, 14 Pages.

(Continued)

*Primary Examiner* — Sarai E Butler
(74) *Attorney, Agent, or Firm* — Buckley, Maschoff & Talwalkar LLC

(57) ABSTRACT

A system may include a node historical state data store having historical node state data, including a metric that represents a health status or an attribute of a node during a period of time prior to a node failure. A node failure prediction algorithm creation platform may generate a machine learning trained node failure prediction algorithm. An active node data store may contain information about computing nodes in a cloud computing environment, including, for each node, a metric that represents a health status or an attribute of that node over time. A virtual machine assignment platform may then execute the node failure prediction algorithm to calculate a node failure probability score for each computing node based on the information in the active node data store. As a result, a virtual machine may be assigned to a selected computing node based at least in part on node failure probability scores.

20 Claims, 11 Drawing Sheets

800

| NODE IDENTIFIER 802 | DATE (TIME) 804 | TIME-SERIES DATA 806 | TEMPERATURE 808 | NUMBER OF CPUs 810 | OPERATING SYSTEM 812 | NODE STATE 814 | FAILURE MODE 816 |
|---|---|---|---|---|---|---|---|
| N_0834 | 7/4/2020 (10:8.4) | 〜 | 72° F | 8 | LINUX | FAILURE | DISK FAIL |
| N_1022 | 7/4/2020 (11:31.6) | 〜 | 80° F | 8 | WINDOWS 10 | FAILURE | TIMEOUT |
| N_1730 | 7/4/2020 (8:06.6) | 1.1, 1.2, 1.3, 1.2, ... | 75° F | 16 | WINDOWS 10 (UPDATE 1.2.3) | HEALTHY | |
| N_1007 | 7/4/2020 (14:58.1) | 〜 | 77° F | 8 | WINDOWS 10 | HEALTHY | |

(51) Int. Cl.
  *G06N 20/00* (2019.01)
  *G06F 9/455* (2018.01)
  *G06N 5/04* (2006.01)
  *G06N 7/00* (2006.01)

(52) U.S. Cl.
  CPC .............. *G06N 5/04* (2013.01); *G06N 7/005* (2013.01); *G06N 20/00* (2019.01); *G06F 2009/45591* (2013.01); *G06F 2009/45595* (2013.01)

(58) Field of Classification Search
  USPC .......................................................... 714/26
  See application file for complete search history.

(56) References Cited

U.S. PATENT DOCUMENTS

| | | | | |
|---|---|---|---|---|
| 2004/0003319 | A1* | 1/2004 | Ukai | G06F 11/0712 714/25 |
| 2013/0117448 | A1 | 5/2013 | Nahum et al. | |
| 2016/0196175 | A1* | 7/2016 | Kasahara | G06F 11/076 714/49 |
| 2016/0275648 | A1* | 9/2016 | Honda | G06F 3/16 |
| 2016/0306675 | A1 | 10/2016 | Wiggers et al. | |
| 2017/0212815 | A1* | 7/2017 | Yushina | G06F 9/46 |
| 2018/0068554 | A1 | 3/2018 | Naraharisetti et al. | |
| 2019/0196920 | A1* | 6/2019 | Andrade Costa | G06F 11/1438 |

OTHER PUBLICATIONS

"International Search Report and Written Opinion Issued in PCT Application No. PCT/CN2018/093775", dated Mar. 27, 2019, 6 Pages.

* cited by examiner

| NODE IDENTIFIER 802 | DATE (TIME) 804 | TIME-SERIES DATA 806 | TEMPERATURE 808 | NUMBER OF CPUs 810 | OPERATING SYSTEM 812 | NODE STATE 814 | FAILURE MODE 816 |
|---|---|---|---|---|---|---|---|
| N_0834 | 7/4/2020 (10:8.4) | | 72° F | 8 | LINUX | FAILURE | DISK FAIL |
| N_1022 | 7/4/2020 (11:31.6) | | 80° F | 8 | WINDOWS 10 | FAILURE | TIMEOUT |
| N_1730 | 7/4/2020 (8:06.6) | 1.1, 1.2, 1.3, 1.2,... | 75° F | 16 | WINDOWS 10 (UPDATE 1.2.3) | HEALTHY | |
| N_1007 | 7/4/2020 (14:58.1) | | 77° F | 8 | WINDOWS 10 | HEALTHY | |

| ACTIVE NODE IDENTIFIER 902 | TIME-SERIES DATA 904 | TEMPERATURE 906 | NUMBER OF CPUs 908 | OPERATING SYSTEM 910 |
|---|---|---|---|---|
| N_1001 | ~~~ | 71° F | 16 | WINDOWS 10 (UPDATE 1.2.3) |
| N_1002 | ~~~ | 79° F | 8 | WINDOWS 10 |
| N_1003 | 1.1, 1.2, 1.3, 1.2, ... | 77° F | 4 | WINDOWS 10 (UPDATE 3.2.1) |
| N_1004 | ~~~ | 77° F | 8 | LINUX |

FIG. 9

COMPUTING NODE FAILURE AND HEALTH PREDICTION FOR CLOUD-BASED DATA CENTER

BACKGROUND

Could-based data centers may be employed by an enterprise in a variety of settings for running service applications and maintaining data for business and operational functions. For example, a data center within a networked system may support operation of a variety of differing service applications (e.g., web applications, email services, and search engine services). These networked systems typically include a large number of nodes distributed throughout one or more data centers, in which each node is associated with a physical machine. For example, FIG. 1 illustrates a system 100 having a number of computing nodes 110 (nodes 1 through N). Each computing node 110 may execute one or more Virtual Machines ("VM"), such as virtual machines A through D illustrated in FIG. 1. A virtual machine assignment platform 150 may assign new virtual machines 160 to be executed by a particular computing node 160 (e.g., virtual machine X might be assigned to be executed by computing node 1). Due partly to the substantial number of computing nodes 110 that may be included within a large-scale system, detecting anomalies within various nodes 110 can be a time-consuming and costly process.

For example, the computing nodes 110 in the system 100 may be susceptible to hardware errors, software failures, misconfigurations, or bugs affecting the software installed on the nodes 110. Therefore, it may be necessary to inspect the software and/or hardware to fix errors (e.g., a disk failure) within the nodes 110. Generally, undetected software and/or hardware errors, or other anomalies, within the nodes 110 may adversely affect the functionality offered to component programs (e.g., tenants) of a customer's service application residing on the nodes 110.

At the present time, data-center administrators are limited to an individualized process that employs manual efforts directed toward reviewing hardware and software issues individually on each node 110 in a piecemeal fashion. Moreover, the system 100 may represent a dynamic platform that is constantly evolving as it operates. For example, there may be large number of nodes 110 running various combinations of component programs. As such, the configuration of these nodes can vary for each component-program combination. Further, the configurations may be progressively updated as new services and/or features are added to virtual machines and/or node hardware is replaced.

Conventional techniques that attempt to detect misconfigurations are reactionary in nature. For example, conventional techniques are typically invoked only upon a failure issue being detected. At that point, an administrator within the hosting service might be tasked with manually diagnosing the issue and ascertaining a solution. This can make it difficult for a data center to achieve reliability beyond the "four nines" (that is, 99.99% reliability).

What is needed is a system to accurately and efficiently improve data center reliability.

BRIEF DESCRIPTION OF THE DRAWINGS

FIG. 8 is tabular portion of a node failure database in accordance with some embodiments.

FIG. 9 is tabular portion of an active node database according to some embodiments.

DETAILED DESCRIPTION

The following description is provided to enable any person in the art to make and use the described embodiments. Various modifications, however, will remain readily apparent to those in the art.

Figure 1:
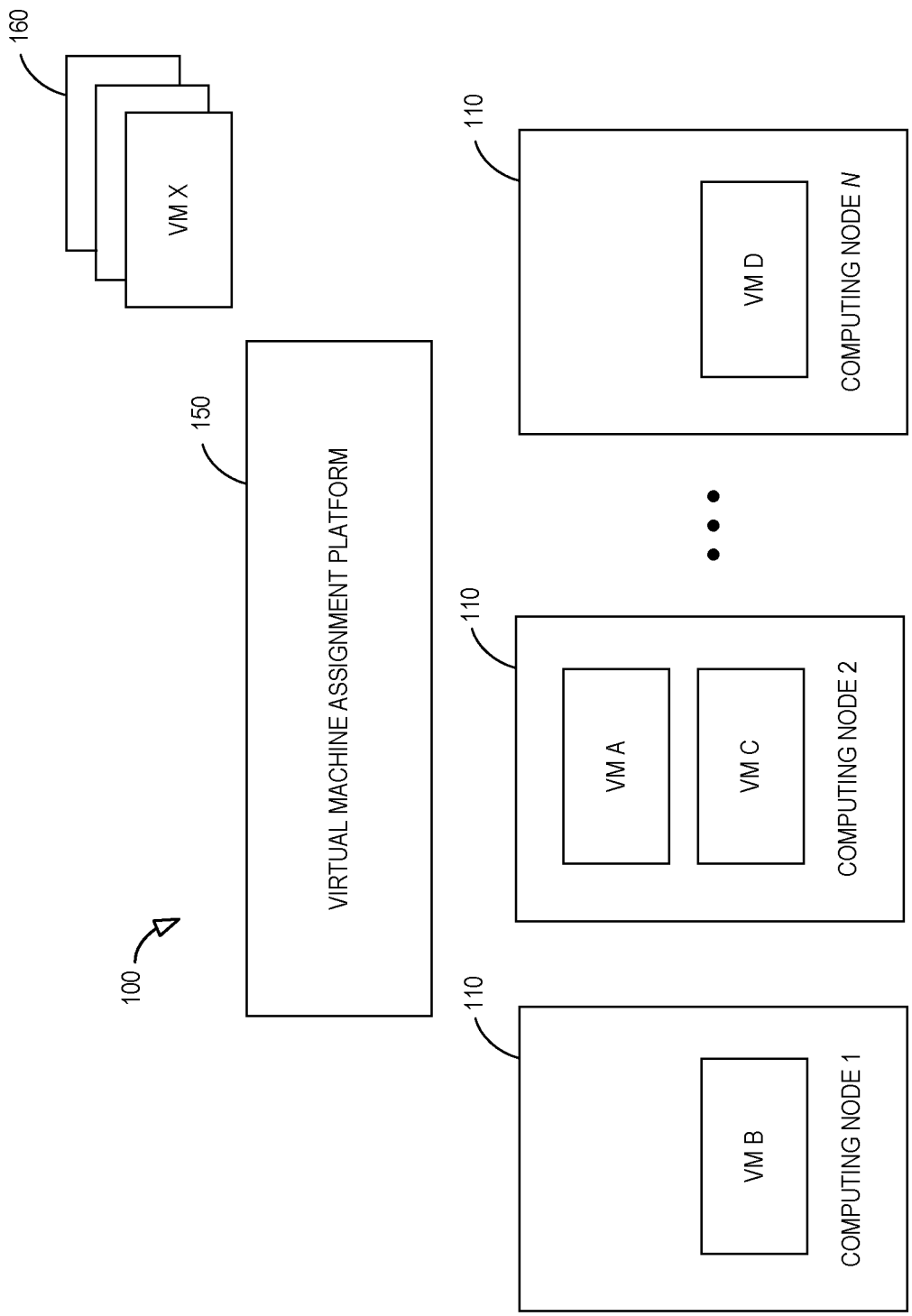
FIG. 1 is a high-level block diagram of a system associated with a cloud computing environment.
Figure 2:
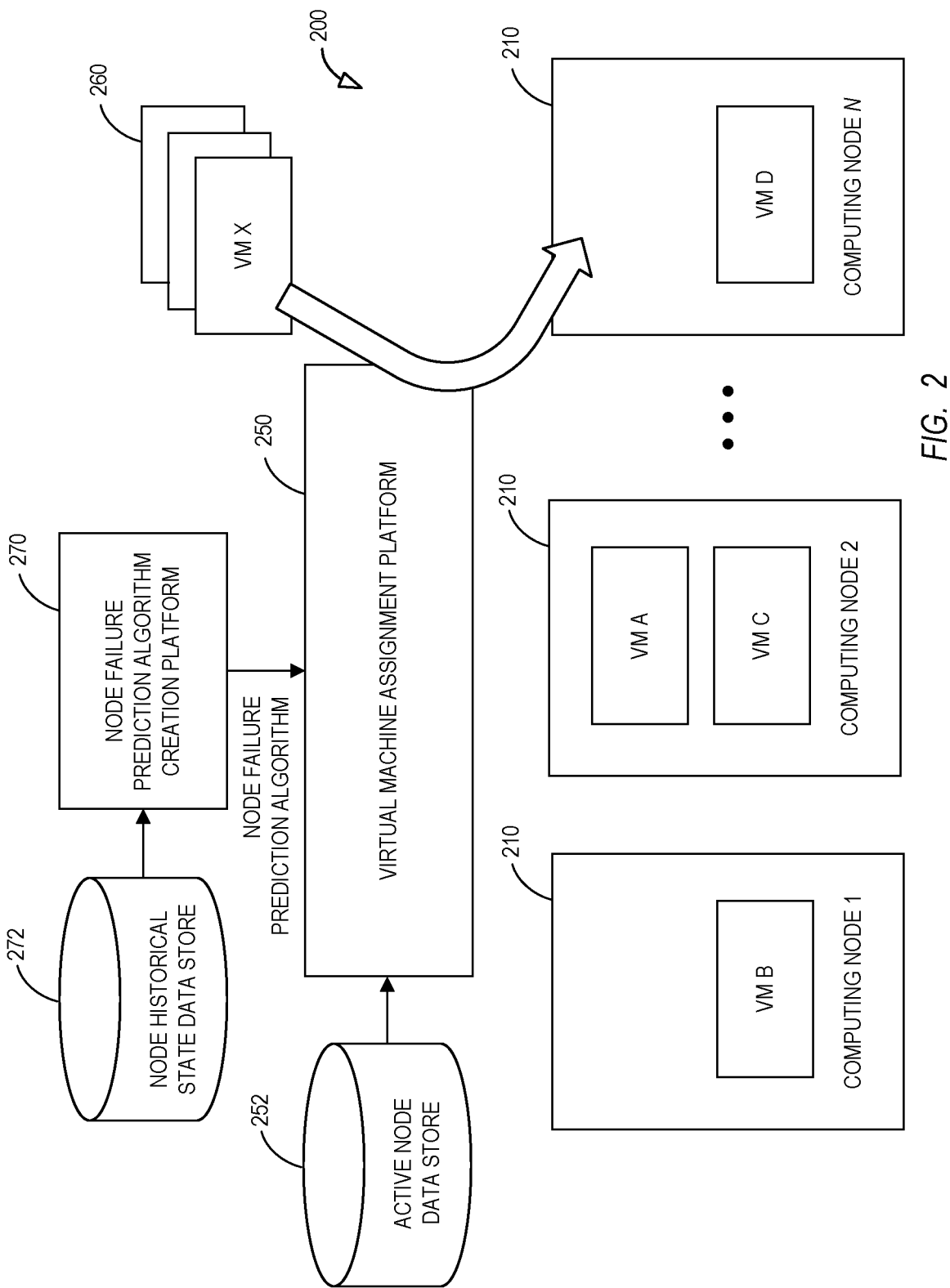
FIG. 2 is a high-level block diagram of a system associated with a cloud computing environment according to some embodiments.

Generally, some embodiments provide systems and methods to accurately and efficiently improve data center reliability. For example, FIG. 2 is a high-level architecture of a system 200 in accordance with some embodiments. The system 200 may include a number of computing nodes 210 (nodes 1 through N). Each computing node 210 may execute one or more Virtual Machines ("VM"), such as virtual machines A through D illustrated in FIG. 2. A virtual machine assignment platform 250 may assign new virtual machines 260 to be executed by a particular computing node 260 (e.g., virtual machine X might be assigned to computing node 1).

According to this embodiment, a node failure prediction algorithm creation platform 270 (which might be associated with, for example, offline or online learning) may access a node historical state data store 272. The node historical state data store 272 might contain, for example, historical node state data including at least one metric that represents a health status or an attribute of a node (e.g., indicating healthy operation or a failure along with a particular mode of failure) during a period of time prior to a node failure (and may include such information for thousands of nodes and/or failures). For example, the attribute might track the number of disk write re-tries that were performed over the last 30 days prior to that node experiencing a failure. Note that information in the node historical state data store 272 might come directly from a signal emitted by a computing node 260. In this way, the system 200 may generate up-to-date learning models to keep with a dynamic cloud environment. The algorithm creation platform 270 may use that data to generate a "machine learning" trained node failure prediction algorithm that can be provided to the virtual machine assignment platform 250. As used here, the phrase "machine learning" may refer to any approach that uses statistical techniques to give computer systems the ability to learn (i.e., progressively improve performance of a specific task) with data without being explicitly programmed. Examples of machine learning may include decision tree learning, association rule learning, artificial neural networks deep learning, inductive logic programming, Support Vector Machines ("SVM"), clustering, Bayesian networks, reinforcement learning, representation learning, similarity and metric learning, sparse dictionary learning, genetic algorithms, rule-based machine learning, learning classifier systems, etc.

The virtual machine assignment platform 250 may use the machine learning trained node failure prediction algorithm along with information from an active node data store 252 (e.g., containing configuration and/or operational details about available computing nodes 210) to calculate node failure probability scores for each of the computing nodes 210. A new virtual machine 260 may then be assigned to particular computing node 210 based on those scores (as illustrated by the arrow in FIG. 2).

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The virtual machine assignment platform 250 may store information into and/or retrieve information from various data sources, such as the active node data store 252. The various data sources may be locally stored or reside remote from the virtual machine assignment platform 250. Although a single virtual machine assignment platform 250 is shown in FIG. 2, any number of such devices may be included. Moreover, various devices described herein might be combined according to embodiments of the present invention. For example, in some embodiments, the node failure prediction algorithm creation platform 270 and virtual machine assignment platform 250 might comprise a single apparatus. The node failure prediction algorithm creation platform 270 and/or virtual machine assignment platform 250 functions may be performed by a constellation of networked apparatuses in a distributed processing or cloud-based architecture.

A user may access the system 200 via remote monitoring devices (e.g., a Personal Computer ("PC"), tablet, smartphone, or remotely through a remote gateway connection to view information about and/or manage data center operation in accordance with any of the embodiments described herein. In some cases, an interactive graphical display interface may let a user define and/or adjust certain parameters (e.g., virtual machine assignments) and/or provide or receive automatically generated recommendations or results from the node failure prediction algorithm creation platform 270 and/or virtual machine assignment platform 250.

In this way, a cloud infrastructure may utilize a fault-prediction algorithm to intelligently allocate virtual machines on healthier nodes 210, so that these virtual machines are less likely to suffer future failures. For the nodes 210 that are highly likely to have specific hardware issue, action can be taken to correct the issue.

To predict the fault risk of nodes, the system 200 may leverage a diverse set of features, including physical hardware properties (such as CPU speed, manufacturer, memory, disk sizes), software versions of key cloud components, historical Windows events, etc. The system 200 may use historical node failures records as labels, and train a machine learning algorithm to predict whether a node is likely to suffer failures. To reduce faulty hardware in a data center, and facilitate discussion with hardware vendors to improve future hardware planning, an enterprise might leverage a top-N evaluation to select highly confident failure samples with relevant a feature set and send the information to vendors for diagnosis.

There may be technical challenges when designing an appropriate fault-prediction algorithm at a substantially large scale. For example, such a prediction problem (in this case, whether a node is likely to fail) is traditionally a classification problem. However, a relatively large data center might have extremely imbalanced labels (typically only 0.1% of nodes might fault per day). This makes training and evaluating a model difficult. For example, a simple-minded algorithm that always returns "healthy" might be correct 99.9% of the time. Thus, it can be a challenge to effectively train a model with such imbalanced samples. To address this issue, some embodiments may frame the machine learning problem as one of learning-to-rank. Instead of simply classifying whether a node is likely to fault, the system generates a likelihood that a node is likely to fail. When evaluating the model, the simple precision/recall analysis of traditional classification models can be extended. For example, precision/recall might now be evaluated at different ranked buckets, and the model may be optimized for different business needs.

Another challenge is that the feature set may be diverse in several aspects, and it can be non-trivial to combine them in a cohesive framework. In addition to the categorical-numerical divide, time-series features (such as Windows events) might be utilized. Furthermore, the feature set can have features with different temporal dynamics: physical hardware information that are completely static; software versions that are semi-static (e.g., change about once a month); and/or Windows events that are dynamic (e.g., updating every hour or any other period of time). It can be a challenge to combine these features into an ensemble of models to best utilize the power of the diverse data sources. To address this issue, some embodiments select Windows events and turn time-series data (e.g., minute-by-minute values over the last 24 hours) into several features (e.g., "current-count," "count-yesterday," "count-in-past-7-days." etc.) that can be combined with other non-time-series features. According to some embodiments, more advanced approaches (e.g., associated with Long-Short Term Memory ("LSTM") may be employed. Note that data might be "dynamically" updated, consumed, and/or recorded in accordance with any of the embodiments described herein.

Still another challenge is that some hardware problems, such as intermittent disk Input Output ("IO") timeout, might not immediately observable or detectable. Furthermore, these latent hardware issue may surface as different failures higher in the execution stack and create a noisy label data set. For example, execution failures due to timeout violation may be fundamentally caused by bad disks. It can be challenging to identify underlying reasons for a problem, and many unlabeled samples may be labeled as negative samples by default. To address this issue, some embodiments utilize a feedback loop to actively select nodes for stress testing in order to obtain the underlying truth. The underlying truth can then be fed into a next iteration of learning.

Figure 3:
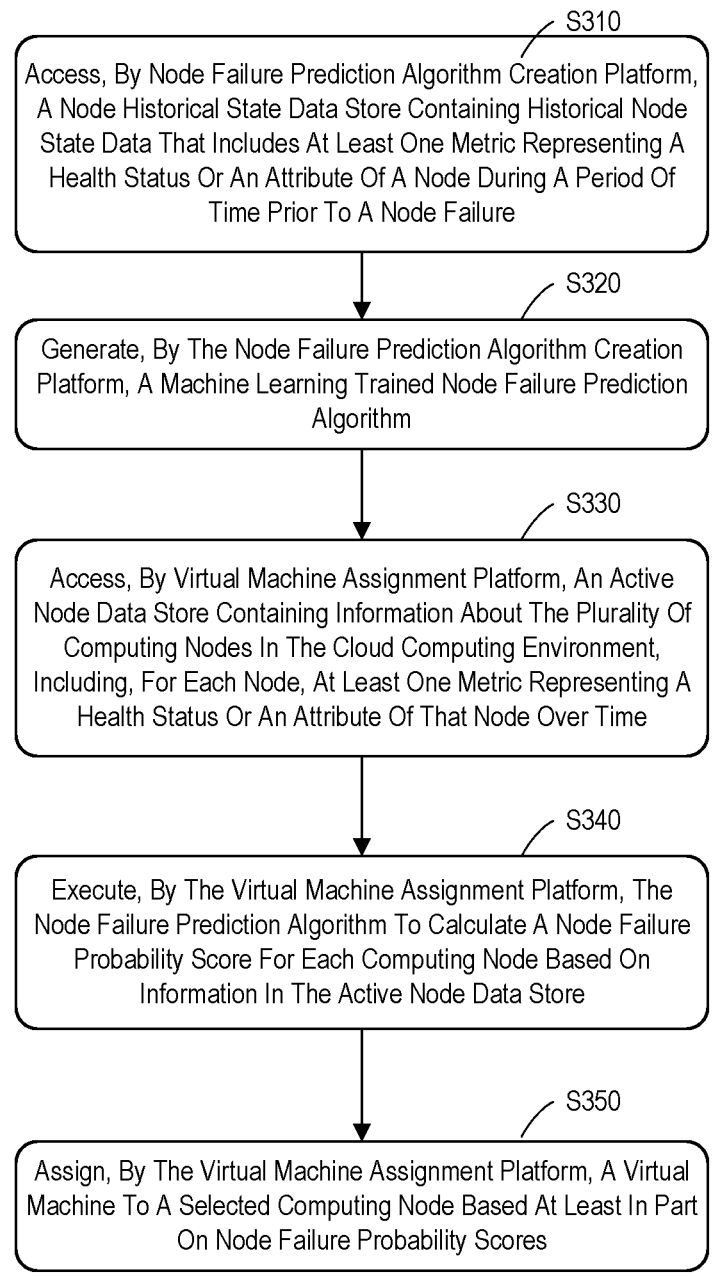
FIG. 3 is a flow diagram of a process in accordance with some embodiments.

FIG. 3 is a flow diagram of a process to improve data center reliability in accordance with some embodiments. Note that the flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a node failure prediction algorithm creation platform may access a node historical state data store containing historical node state data, the historical node state data including at least one metric that represents a health status or an attribute of a node during a period of time prior to a node failure. The information in the node historical state data store might include, for example, physical hardware properties, software versions, and/or Operating System ("OS") events associated with the computing node. Examples of physical hardware properties might include Central Processing Unit ("CPU") speed, a CPU manufacturer, memory properties, disk size, etc. Examples of software version numbers might include information about a cloud component, an OS version and related updates, a driver, etc.

Examples of OS events might include, for example, an error event (e.g., indicating a significant problem such as loss of data or loss of functionality), a warning event (e.g., an event that is not necessarily significant but may indicate a possible future problem), an information event (e.g., an event that describes the successful operation of an application, driver, or service, an audit event (associated with a successful or failed audit), etc.

Note that the information in the node historical state data store might also include external factors, such as temperature, humidity, vibration, sound (e.g., a noisy fan), performance speed, network traffic, etc.

As can be seen, the information contained in the node historical state data store can include static data (a CPU manufacture), dynamic data (response time), categorical data ("active" or "inactive"), numerical data (temperature), time-series data (e.g., minute-by-minute values over the last 24 hours or any other period of time), etc.

At S320, the node failure prediction algorithm creation platform may automatically generate a machine learning trained node failure prediction algorithm based on the information in the node historical state data store.

At S330, a virtual machine assignment platform may access an active node data store containing information about the plurality of computing nodes in the cloud computing environment, including, for each node, at least one metric that represents a health status or an attribute of that node over time. Note that the information in the active node data store might include any of the data (or types of data) described with respect to the node failure data store. At S340, the virtual machine assignment platform may execute the node failure prediction algorithm to calculate a node failure probability score for each computing node based on the information in the active node data store. The probability might be, for example, a percentage value, a category (e.g., "high," "medium," or "low"), a rank, etc.

At S350, the virtual machine assignment platform may assign a virtual machine to a selected computing node based at least in part on node failure probability scores. This assignment might be associated with, for example, an assignment of a newly created virtual machine to the selected computing node (e.g., as illustrated in connection with FIG. 2).

Figure 4:
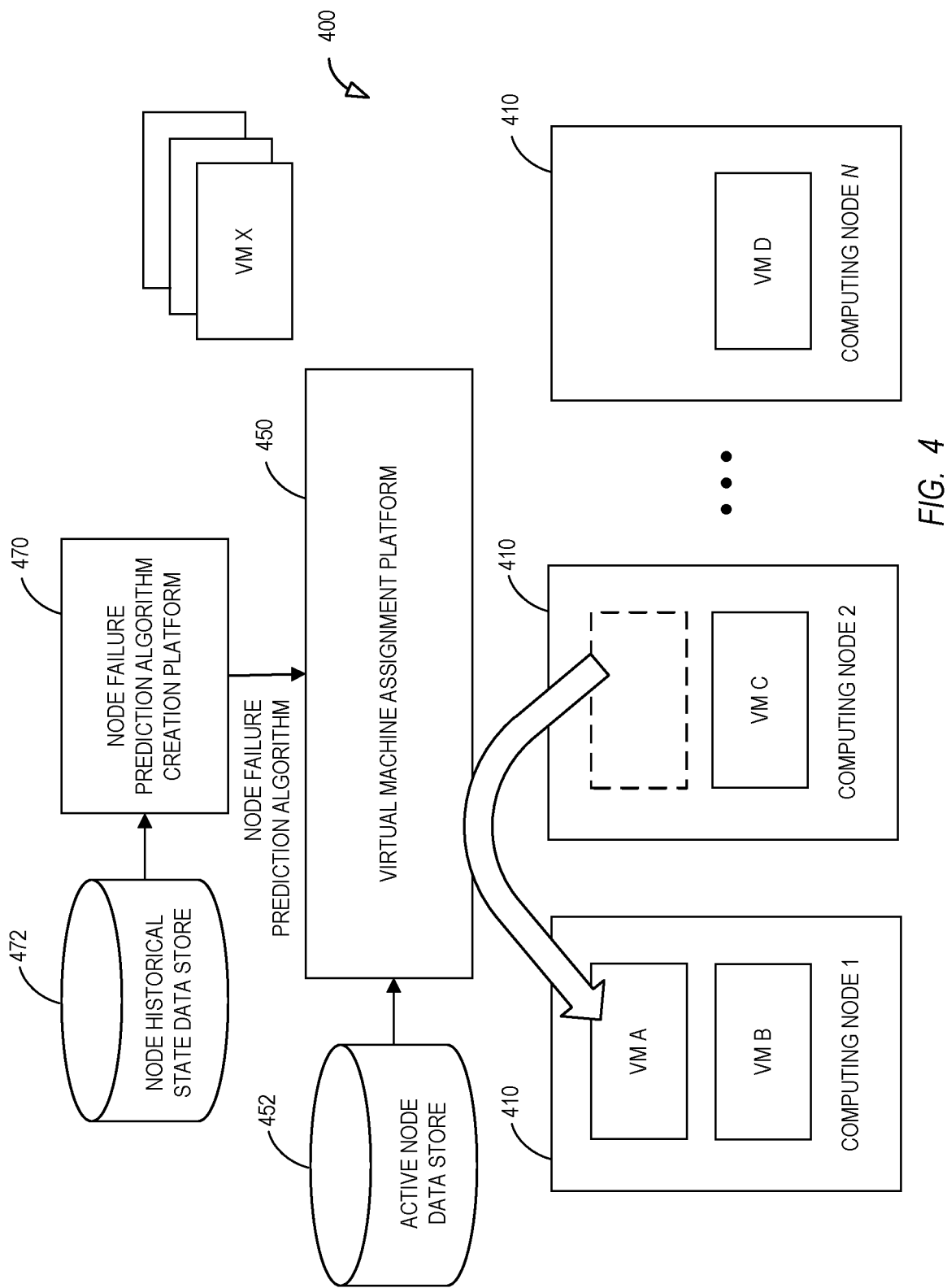
FIG. 4 is a high-level block diagram of a system associated with a cloud computing environment according to some embodiments.

According to other embodiments, the assignment comprises re-assignment of an existing virtual machine to the selected computing node from another computing node. FIG. 4 is a high-level block diagram of a system 400 associated with a cloud computing environment according to some embodiments. As before, the system 200 may include a number of computing nodes 410 (nodes 1 through N). Each computing node 410 may execute one or more Virtual Machines ("VM"), such as virtual machines A through D illustrated in FIG. 4. A virtual machine assignment platform 450 may assign new virtual machines 460 to be executed by a particular computing node 460 (e.g., virtual machine X might be assigned to computing node 1).

A node failure prediction algorithm creation platform 470 may access a node historical state data store 472 containing historical node state data including at least one metric that represents a health status or an attribute of a node during a period of time prior to a node failure. The algorithm creation platform 470 may use that data to generate a "machine learning" trained node failure prediction algorithm that can be provided to the virtual machine assignment platform 450. The virtual machine assignment platform 450 may use the machine learning trained node failure prediction algorithm along with information from an active node data store 452 to calculate node failure probability scores for each of the computing nodes 410. The scores can then be used to move existing virtual machines from less healthy nodes to more healthy nodes (e.g., VM A might be moved from computing node 2 to computing node 1 as illustrated in FIG. 4). In this way, the fault-prediction algorithm may improve virtual machine availability post-allocation by proactively migrating live virtual machines residing on high-risk nodes to nodes with lower risks.

Figure 5:
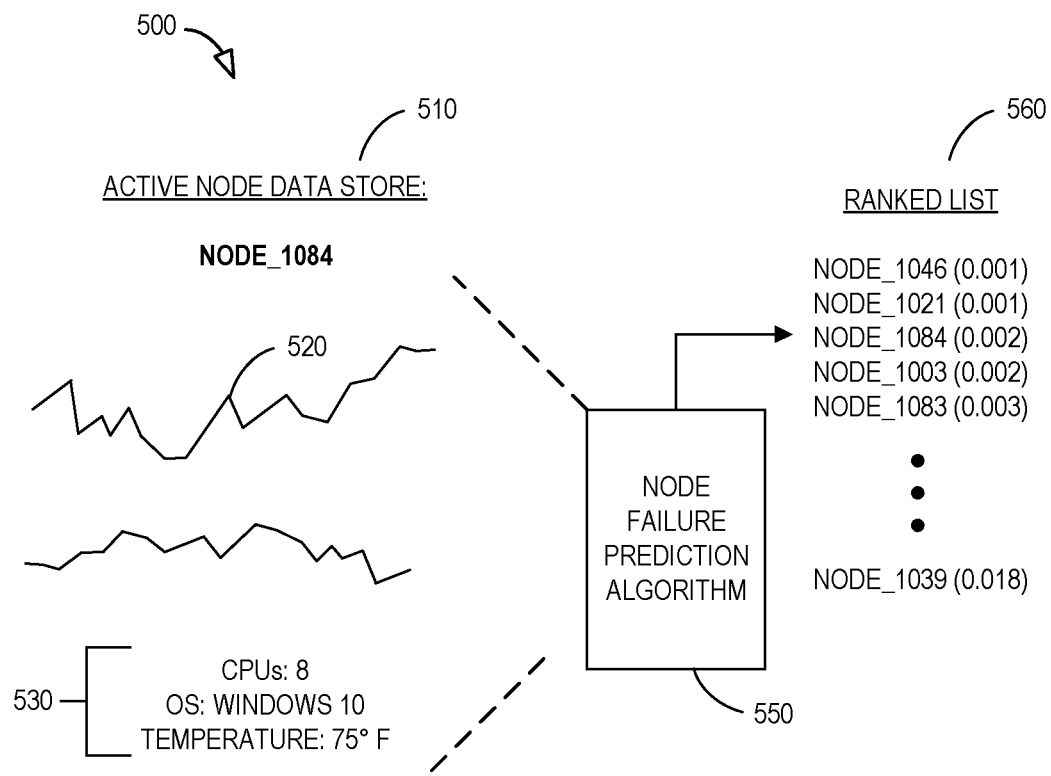
FIG. 5 is a data flow diagram in accordance with some embodiments.

FIG. 5 is a data flow diagram 500 in accordance with some embodiments. In particular, a node failure prediction algorithm 550 may receive data from an active node data store 510. The active node data store 510 may include information about computing nodes available to execute virtual machines at a data center, including time-series values 520 and discrete and varying numerical values 530. As illustrated in FIG. 5, the data for "Node_1084" may be provided to the node failure prediction algorithm 550 which in turn generates a probability of failure (that particular node has a "0.002" percent of failing in the next 24 hours, although any other period of time might be used instead). According to some embodiments, the system periodically creates a ranked list 560 of a set of computing nodes based on the associated node failure probability scores (e.g., from the most healthy node to the least healthy). The ranked list 560 might be used, for example, to generate a report for manual troubleshooting by an enterprise associated with the cloud computing environment. That is, he or she can concentrate on investigate only the most least healthy nodes. According to some embodiments, a report may be generated for manual troubleshooting by one or more vendors that supplied components of computing nodes and/or to create a stress test report (e.g., so that a certain type of node can be stressed to determine if a failure will occur).

Figure 6:
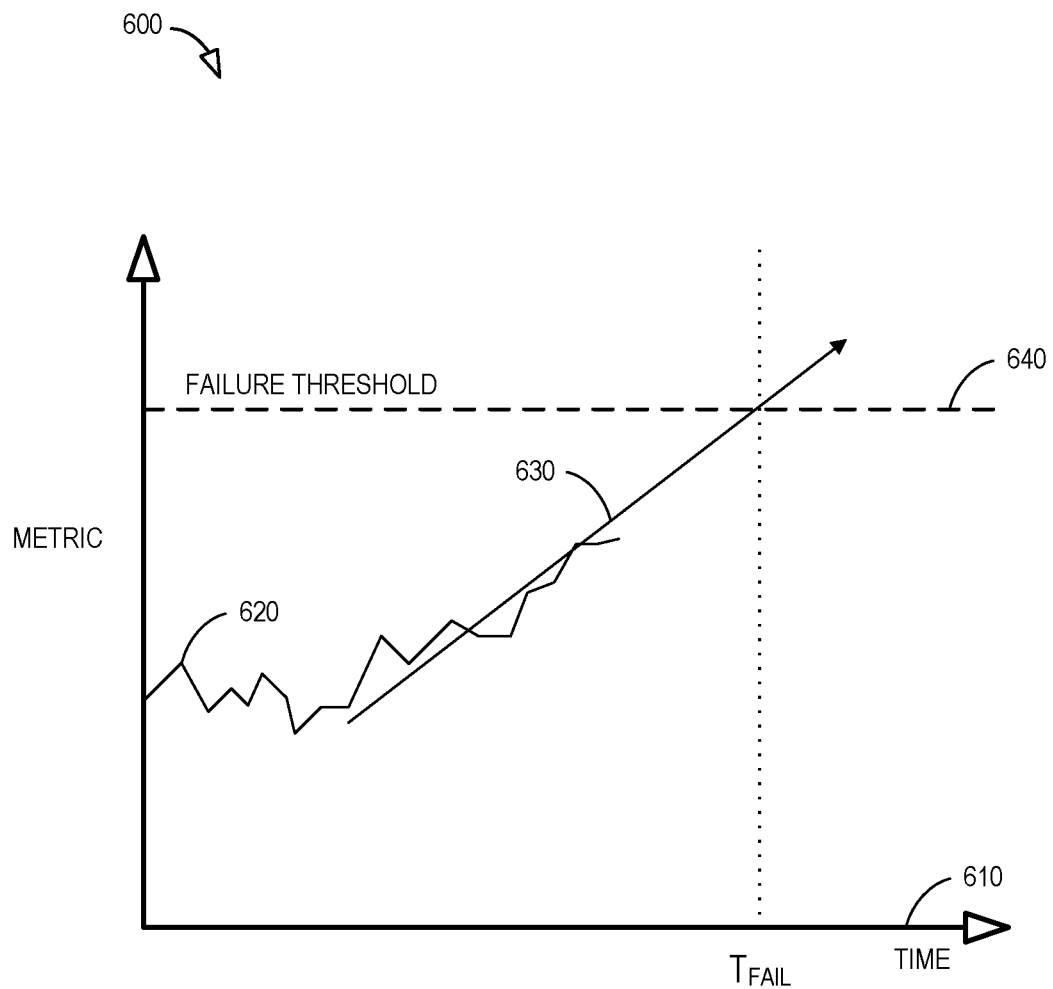
FIG. 6 illustrates a node failure prediction according to some embodiments.

FIG. 6 illustrates a node failure prediction 600 according to some embodiments. A graph includes a time axis 610 for a performance metric (e.g., disk speed). Patterns in the performance metric 620 can be used to predict or estimate 630 a future value of that metric. According to some embodiments, when it is predicted that the metric exceeds a failure threshold 640 the system may predict a node failure (e.g., at time $T_{FAIL}$). Thus, a virtual machine assignment platform may predict a future failure of a particular node based on an extrapolation of the at least one metric that represents operation of that node over time, either alone or in combination with other information.

Figure 7:
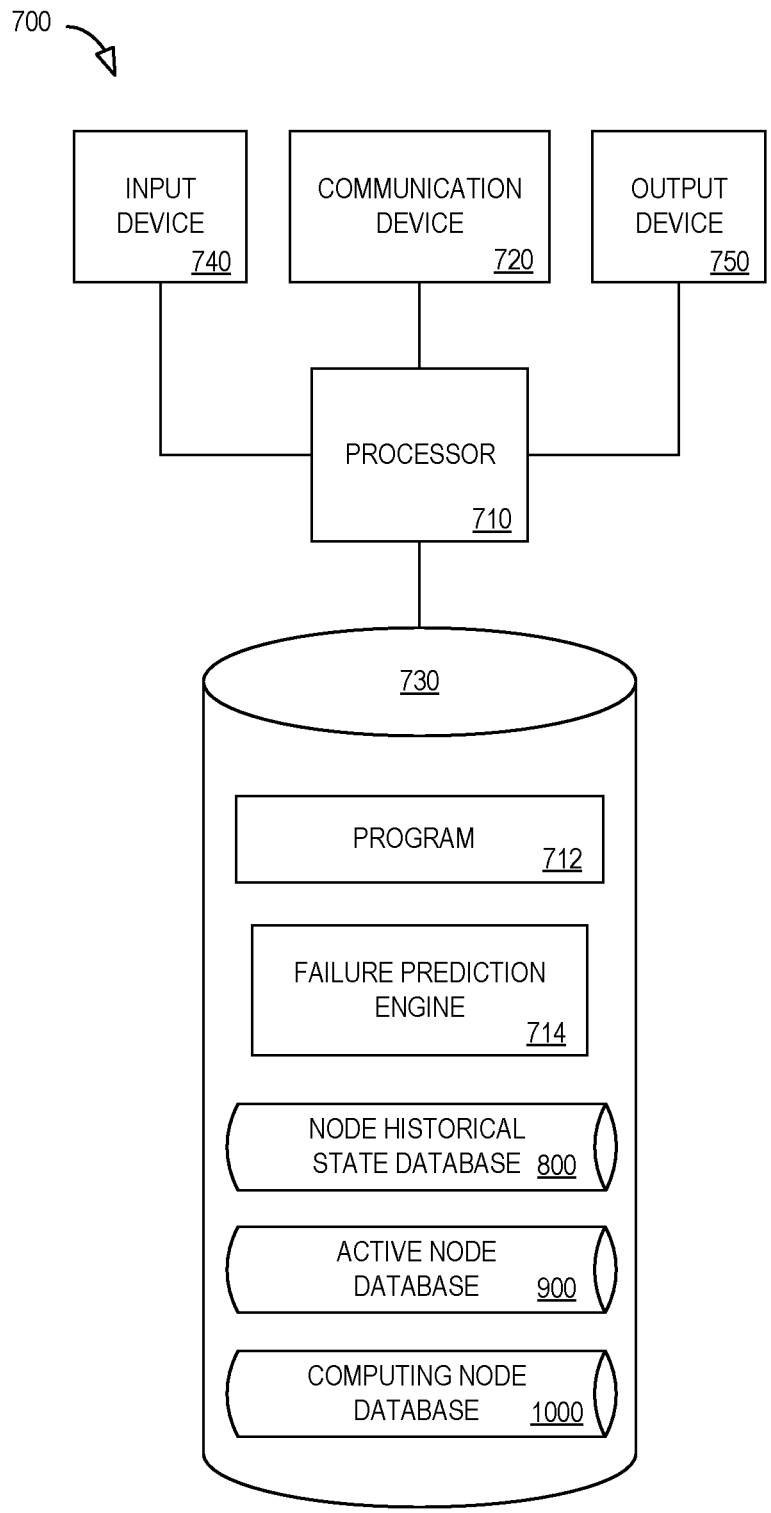
FIG. 7 illustrates a data center management platform according to some embodiments.

The embodiments described herein may be implemented using any number of different hardware configurations. For example, FIG. 7 is a block diagram of a data center management apparatus or platform 700 that may be, for example, associated with the system 200 of FIG. 2 or any other system described herein. The data center management platform 700 comprises a processor 710, such as one or more commercially available Central Processing Units ("CPUs") in the form of one-chip microprocessors, coupled to a communication device 720 configured to communicate via a communication network (not shown in FIG. 7). The communication device 720 may be used to communicate, for example, with one or more remote pressure control units, human access safety doors, etc. The data center management platform 700 further includes an input device 740 (e.g., a computer mouse and/or keyboard to input data center information) and/an output device 750 (e.g., a computer monitor to render a display, provide alerts, transmit recommendations, and/or create reports). According to some embodiments, a mobile device, monitoring physical system, and/or PC may be used by an operator to exchange information with the data center management platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 716 and/or a failure prediction engine 714 for controlling the processor 710. The processor 710 performs instructions of the programs 716, 714, and thereby operates in accordance with any of the embodiments described herein. For example, the processor 710 may access a node historical state data store containing historical node failure data, the historical node failure data including at least one metric that represents a health statuss or an attribute of a node during a period of time prior to a node failure. The processor 710 may generate a machine learning trained node failure prediction algorithm. The processor 710 may also access an active node data store containing information about the plurality of computing nodes in the cloud computing environment, including, for each node, at least one metric that represents a health status or attribute of that node over time. The processor 710 can the execute the node failure prediction algorithm to calculate a node failure probability score for each computing node (based on the information in the active node data store) and assign virtual machines to computing nodes based on those scores.

The programs 716, 714 may be stored in a compressed, uncompiled and/or encrypted format. The programs 716, 714 may furthermore include other program elements, such as an operating system, clipboard application, a database management system, and/or device drivers used by the processor 710 to interface with peripheral devices.

As used herein, information may be "received" by or "transmitted" to, for example: (i) the data center management platform 700 from another device; or (ii) a software application or module within the data center management platform 700 from another software application, module, or any other source.

In some embodiments (such as the one shown in FIG. 7), the storage device 730 further stores a node historical state database 800, an active node database 900, and a computing node database 1000. Examples of databases that may be used in connection with the data center management platform 700 will now be described in detail with respect to FIGS. 8 through 10. Note that the databases described herein are only examples, and additional and/or different information may be stored therein. Moreover, various databases might be split or combined in accordance with any of the embodiments described herein.

Referring to FIG. 8, a table is shown that represents the node historical state database 800 that may be stored at the data center management platform 700 according to some embodiments. The table may include, for example, entries identifying past health status and/or attributes that existed at a data center. The table may also define fields 802, 804, 806, 808, 810, 812, 814, 816 for each of the entries. The fields 802, 804, 806, 808, 810, 812, 814, 816 may, according to some embodiments, specify: a node identifier 802, a date and time 804, time-series data 806, temperature 808, number of CPUs 810, OS data 812, a node state 814, and a failure mode indication or description 816. The node historical state database 800 may be created and updated, for example, based on information periodically received in connection with computing nodes.

The node identifier 802 might be a unique alphanumeric code associated with a particular computing node. The data and time 804 might indicate when information was recorded for that node. The time-series data 806 might include a series of values representing operation of the node over the prior 90 days (by way of example only). The temperature 808 indicate the local temperate at the computing node, the number of CPUs 810 might indicate how many CPUs are employed by the node, and the OS 812 might indicate a software version and/or update information. The node state 812 may indicated whether the node was "healthy" or experiencing a "failure." In the case of a "failure," the failure mode 816 may provide more detailed information about why the node stopped functioning. The information in the node historical state database 800 may be input to a machine learning process to create a failure prediction algorithm. According to some embodiments, the process may also be trained with healthy node data (e.g., representing computing nodes that did not experience a failure). Note that the node historical state database 800 might internally keep date by other means. For example, it may keep one table for substantially static properties (e.g., hardware configuration), another table for dynamic data that changes rapidly over time, and still another table for slowly changing configurations.

Referring to FIG. 9, a table is shown that represents the active node database 900 that may be stored at the data center management platform 700 according to some embodiments. The table may include, for example, entries identifying current values for computing nodes that are available to execute virtual machines. The table may also define fields 902, 904, 906, 908, 910 for each of the entries. The fields 902, 904, 906, 908, 910 may, according to some embodiments, specify: an active node identifier 902, time-series data 904, temperature 906, number of CPUs 908, and OS data 910. The active node database 900 may be created and updated, for example, based on information periodically received from a computing center management system.

The active identifier 902 might be a unique alphanumeric code associated with a particular computing node. The time-series data 904 might include a series of values representing operation of the node over the prior 90 days (by way of example only). The temperature 906 indicate the local temperate at the computing node, the number of CPUs 908 might indicate how many CPUs are employed by the node, and the OS 910 might indicate a software version and/or update information. The information in the active node database 900 may be similar to the information in the failed node database 800 and may be input to a failure prediction algorithm.

Figure 10:
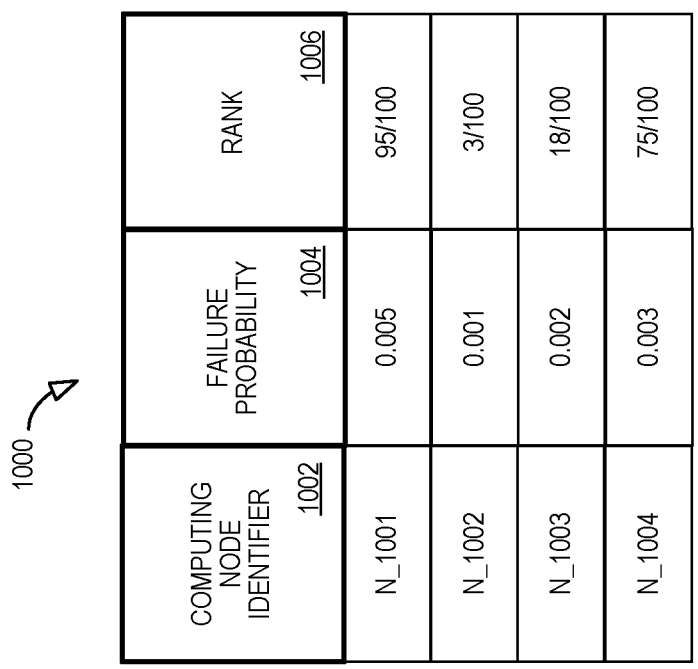
FIG. 10 is tabular portion of a computing node database in accordance with some embodiments.

Referring to FIG. 10, a table is shown that represents the computing node database 1000 that may be stored at the data center management platform 700 according to some embodiments. The table may include, for example, entries identifying computing nodes that have been evaluated by a failure prediction algorithm. The table may also define fields 1002, 1004, 1006 for each of the entries. The fields 1002, 1004, 1006 may, according to some embodiments, specify: a computing node identifier 1002, a failure probability 1004 and a rank 1006. The computing database 1000 may be created and updated, for example, based on results of a failure prediction algorithm (trained with machine learning) using current information from the active node database 900 as inputs.

The computing node identifier 1002 might be a unique alphanumeric code associated with a particular computing node and may be based on, or associated with the active node identifier 902 in the active node database 900. The failure probability 1004 might represent a percentage, a category, etc. Embodiments might utilize a probability of non-failure. The rank 1006 indicates where that particular node stands with respect to other computing nodes (e.g., with the ranked list of FIG. 10 assuming 100 available computing nodes). Nodes higher on the list (that is less likely to fail), might be assigned a virtual machine before other nodes who are lower on the list. Similarly, healthy nodes might be assigned more difficult workloads as compared to unhealthy nodes.

Figure 11:
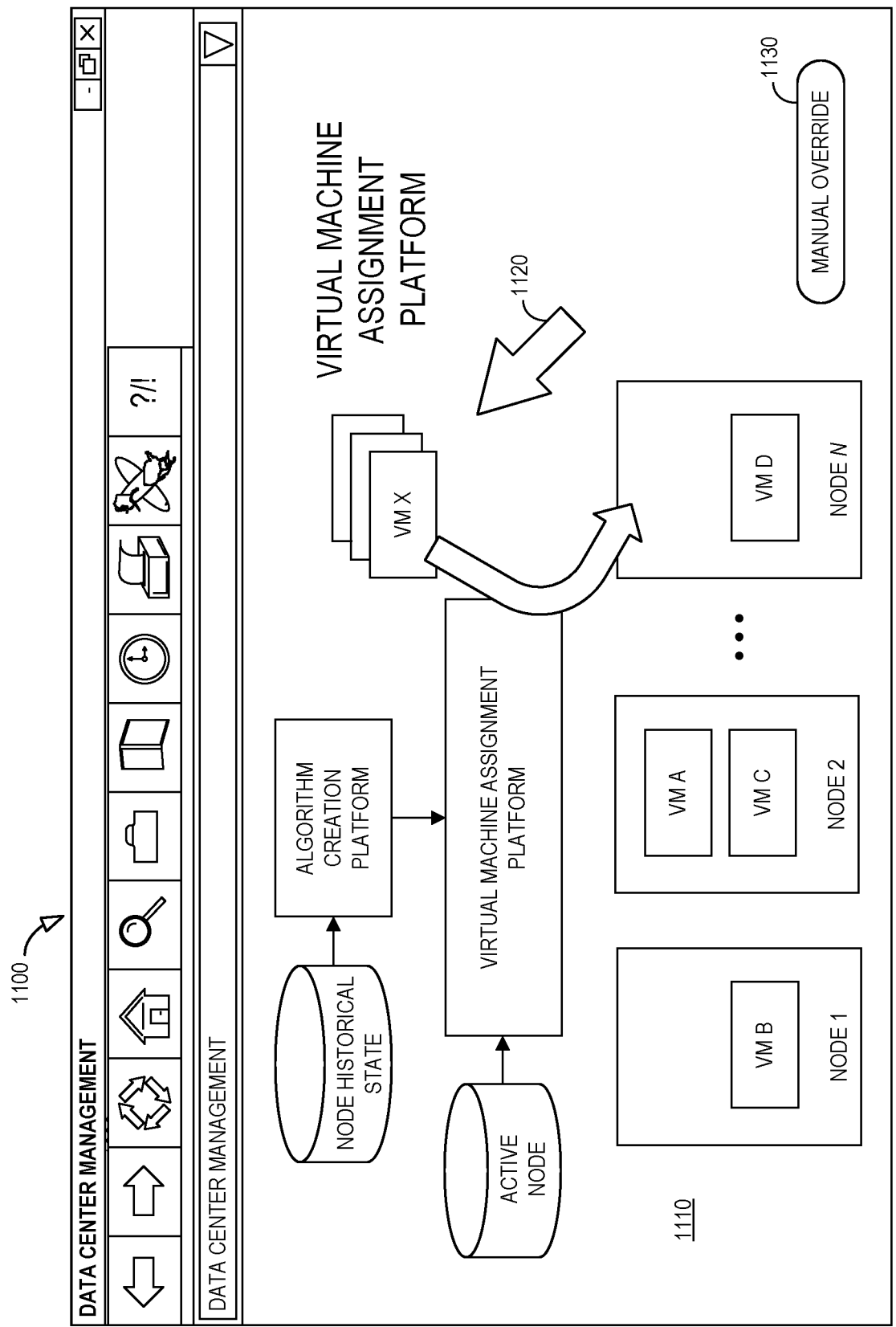
FIG. 11 is an example of a data center management display according to some embodiments.

An operator might manage and/or monitor the performance of data center computing nodes. For example, FIG. 11 is an example of a data center management display 1100 according to some embodiments. The display 1100 includes graphical depictions 1110 of elements of a data center (including nodes, virtual machines, etc.). According to some embodiments, selection of an element via a touchscreen or computer mouse pointer 1120 may result in additional information being provided about that element (e.g., in a pop-up window) and/or let an operator adjust parameters for that element. Moreover, in some embodiments, selection of a "Manual Override" icon 1130 may let an operator shutdown or otherwise alter the automatic determination of virtual machine assignments.

Thus, embodiments may provide systems and methods to accurately and efficiently improve data center reliability. Moreover, machine learning based failure and health prediction may be integrated as part of the cloud infrastructure to provide high customer virtual machine availability and/or prioritize virtual machine allocation by node health prediction score (e.g., live migration of virtual machines away from highly-likely-to-fail nodes based on failure predictions).

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system associated with a cloud computing environment having a plurality of computing nodes, comprising:
   a node historical state data store containing historical node state data, the historical node state data including a first set of time-series data that represents an attribute of a node during a period of time prior to a node failure, and a first set of non-time-series data that represents a second attribute of a node during a period of time prior to a node failure;
   a node failure prediction algorithm creation platform, coupled to the node historical state data store, to generate a machine-learned node failure prediction algorithm, where generation of the node failure prediction algorithm comprises conversion of the first set of time-series data into a second set of non-time-series data, and combination of the second set of non-time-series data with the first set of non-time-series data;
   an active node data store containing information about the plurality of computing nodes in the cloud computing environment, including, for each node, a second set of time-series data that represents an attribute of that node over time, a third set of non-time-series data generated based on the second set of time-series data, a fourth set of non-time-series data that represents a second attribute of a node during a period of time prior to a node failure, and a fifth set of non-time-series data generated based on the third set of non-time-series data and the fourth set of non-time-series data; and
   a virtual machine assignment platform, coupled to the active node data store, to:
      execute the node failure prediction algorithm to determine a node failure probability score for each of the plurality of computing nodes based on the fifth set of non-time-series data in the active node data store,
      create a ranked list of two or more of the plurality of computing nodes based on the determined node failure probability scores,
      select one of the two or more of the plurality of computing nodes based at least in part on the ranked list, and
      assign a virtual machine to the selected computing node.

2. The system of claim 1, wherein said assignment is associated with at least one of: (i) assignment of a newly created virtual machine to the selected computing node, and (ii) re-assignment of an existing virtual machine to the selected computing node from another computing node.

3. The system of claim 1, wherein the information contained in the active node data store includes at least one of: (i) physical hardware properties, (ii) software versions, and (iii) operating system events.

4. The system of claim 3, wherein the information contained in the active node data store includes physical hardware properties associated with at least one of: (i) central processing unit speed, (ii) central processing unit manufacturer, (iii) memory properties, and (iv) disk size.

5. The system of claim 3, wherein the information contained in the active node data store includes software versions associated with at least one of: (i) a cloud component, (ii) an operating system, and (iii) a driver.

6. The system of claim 3, wherein the information contained in the active node data store includes operating system events associated with at least one of: (i) an error event, (ii) a warning event, (iii) an information event, and (iv) an audit event.

7. The system of claim 3, wherein the information contained in the active node data store includes external factors associated with at least one of: (i) temperature, (ii) humidity, (iii) vibration, (iv) sound, (v) performance speed, and (vi) network traffic.

8. The system of claim 3, wherein the information contained in the active node data store includes at least one of: (i) static data, (ii) dynamic data, (iii) categorical data, (iv) numerical data, and (v) time-series data.

9. The system of claim 1, wherein the virtual machine assignment platform is further to predict a future failure of a particular node based on an extrapolation of the at least one metric that represents operation of that node over time, either alone or in combination with other information.

10. The system of claim 1, wherein the system is further to periodically update the ranked list based on updated node failure probability scores.

11. The system of claim 10, wherein the ranked list is used to generate at least one of: (i) a report for manual troubleshooting by an enterprise associated with the cloud computing environment, (ii) a report for manual troubleshooting by one or more vendors that supplied components of computing nodes, (iii) a stress test report, and (iv) a virtual machine prioritization such that a virtual machine with highest customer value is assigned to nodes with lowest failure probability incorporating other constrains.

12. A computer-implemented method associated with a cloud computing environment having a plurality of computing nodes, comprising:
  accessing, by a node failure prediction algorithm creation platform, a node historical state data store containing historical node state data, the historical node state data including a first set of time-series data that represents an attribute of a node during a period of time prior to a node failure, and a first set of non-time-series data that represents a second attribute of a node during a period of time prior to a node failure;
  generating, by the node failure prediction algorithm creation platform, a machine-learned node failure prediction algorithm, where generation of the node failure prediction algorithm comprises conversion of the first set of time-series data into a second set of non-time-series data, and combination of the second set of non-time-series data with the first set of non-time-series data;
  accessing, by a virtual machine assignment platform, an active node data store containing information about the plurality of computing nodes in the cloud computing environment, including, for each node, a second set of time-series data that represents an attribute of that node over time, a third set of non-time-series data generated based on the second set of time-series data, a fourth set of non-time-series data that represents a second attribute of a node during a period of time prior to a node failure, and a fifth set of non-time-series data generated based on the third set of non-time-series data and the fourth set of non-time-series data;
  executing, by the virtual machine assignment platform, the node failure prediction algorithm to determine a node failure probability score for each computing node based on the fifth set of non-time-series data in the active node data store;
  creating, by the virtual machine assignment platform, a ranked list of two or more of the plurality of computing nodes based on the determined node failure probability scores;
  selecting, by the virtual machine assignment platform, one of the two or more of the plurality of computing nodes based at least in part on the ranked list; and
  assigning, by the virtual machine assignment platform, a virtual machine to the selected computing node.

13. The computer-implemented method of claim 12, wherein said assigning is associated with at least one of: (i) assignment of a newly created virtual machine to the selected computing node, and (ii) re-assignment of an existing virtual machine to the selected computing node from another computing node.

14. The computer-implemented method of claim 12, wherein the virtual machine assignment platform is to predict a future failure of a particular node based on an extrapolation of the fifth set of non-time-series data that represents operation of that node over time, either alone or in combination with other information.

15. The computer-implemented method of claim 12, wherein the system is further to periodically update the ranked list of a set of computing nodes based on updated node failure probability scores.

16. The computer-implemented of claim 15, wherein the ranked list is used to generate at least one of: (i) a report for manual troubleshooting by an enterprise associated with the cloud computing environment, (ii) a report for manual troubleshooting by one or more vendors that supplied components of computing nodes, (iii) a stress test report, and (iv) a virtual machine prioritization such that a virtual machine with highest customer value is assigned to nodes with lowest failure probability incorporating other constrains.

17. A non-transient, computer-readable medium storing instructions to be executed by a processor to perform a method associated with a cloud computing environment having a plurality of computing nodes, the method comprising:
  accessing, by a node failure prediction algorithm creation platform, a node historical state data store containing historical node state data, the historical node state data including a first set of time-series data that represents an attribute of a node during a period of time prior to a node failure, and a first set of non-time-series data that represents a second attribute of a node during a period of time prior to a node failure;
  generating, by the node failure prediction algorithm creation platform, a machine-learned node failure prediction algorithm, where generation of the node failure prediction algorithm comprises conversion of the first set of time-series data into a second set of non-time-series data, and combination of the second set of non-time-series data with the first set of non-time-series data;
  accessing, by a virtual machine assignment platform, an active node data store containing information about the plurality of computing nodes in the cloud computing environment, including, for each node, a second set of time-series data that represents an attribute of that node over time, a third set of non-time-series data generated based on the second set of time-series data, a fourth set of non-time-series data that represents a second attribute of a node during a period of time prior to a node failure, and a fifth set of non-time-series data generated based on the third set of non-time-series data and the fourth set of non-time-series data;

executing, by the virtual machine assignment platform, the node failure prediction algorithm to calculate a node failure probability score for each computing node based on the fifth set of non-time-series data in the active node data store;

creating, by the virtual machine assignment platform, a ranked list of two or more of the plurality of computing nodes based on the determined node failure probability scores;

selecting, by the virtual machine assignment platform, one of the two or more of the plurality of computing nodes based at least in part on the ranked list; and assigning, by the virtual machine assignment platform, a virtual machine to the selected computing node.

18. The non-transient, computer-readable medium of claim 17, wherein the information contained in the active node data store includes at least one of: (i) physical hardware properties, (ii) software versions, and (iii) operating system events.

19. The non-transient, computer-readable medium of claim 18, wherein the information contained in the active node data store includes physical hardware properties associated with at least one of: (i) central processing unit speed, (ii) central processing unit manufacturer, (iii) memory properties, and (iv) disk size.

20. The non-transient, computer-readable medium of claim 18, wherein the information contained in the active node data store includes software versions associated with at least one of: (i) a cloud component, (ii) an operating system, and (iii) a driver.

\* \* \* \* \*